Patented Nov. 5, 1935

2,019,539

UNITED STATES PATENT OFFICE 2,019,539

MANUFACTURE OF BENZYL CELLULOSE

Alfred Stoyell Levesley, Saltcoats, and Frederick Charles Randall, Ardrossan, Scotland, assignors to Imperial Chemical Industries Limited, a corporation of Great Britain No Drawing. Application September 16, 1931, Serial No. 563,222. In Great Britain September 19, 1930

10 Claims. (Cl. 260—152)

This invention relates to the manufacture of benzyl cellulose and, in particular, to an improved method for the isolation or purification of the product.

In the manufacture of benzyl cellulose the reaction mass at the end of the benzylation process contains benzylcellulose, together with solvents or partial solvents such as benzyl alcohol, benzyl ether, or benzyl chloride and its condensation products, and a certain amount of salt, free alkali, etc. The mass is therefore obtained in the form of a coherent plastic which is more or less tough, depending on the actual conditions under which the benzylation was carried out.

According to one feature of the present invention cellulose benzyl ether is obtained in a form suitable for the removal of impurities by washing, by incorporating with the benzylated cellulose mass a water-soluble wetting-agent of the high-molecular sulphonic acid type, for example an alkylated naphthalene sulphonic acid or a sulphonated oil such as Turkey red oil.

The quantity of Turkey red oil or other wetting agent used may be quite small, e. g. up to about 10% of the weight of the reaction mass to be treated, but there is no objection to much larger quantities. The incorporation of the sulphonated oil may conveniently be performed in a Werner Pfleiderer or other suitable mixing machine, and is then usually complete in 15-30 mins.

After the incorporation of sulphonated oil, benzl cellulose sufficiently pure for certain purposes may be obtained in the form of fine granules by thorough agitation and washing with water (or with an aqueous solution of sulphonated oil if desired), benzyl chloride and certain of the other impurities being emulsified or dissolved (colloidally or otherwise) and removed in the wash liquors. For instance, the reaction mass after incorporation of Turkey red oil may be transferred to a mixer, fitted with a rapid stirring device, with, for example, 4 to 20 times its weight of water, and after thorough mixing for some hours the aqueous liquor or emulsion may be run off, and the residue washed with further quantities of water.

The crude benzyl cellulose may be further purified, if desired, by means of suitable organic solvents. We have found that the best results are obtained if such solvents are chosen which have no coagulating action on the benzyl cellulose and only a very slight swelling action.

With wash liquors which have a coagulating action on the benzyl cellulose, the washing process is only a surface effect, and there is no penetration into the interior of the small plastic lumps of reaction mass. With a swelling agent, although penetration into the mass is good, the swelling agent is strongly held by the benzyl cellulose and thus the separation of the wash liquor from the solid is difficult in practice and as a consequence the effect of the wash is minimized. Further the admixture of impurities such as di-benzyl ether and benzyl alcohol with a swelling agent may easily lead to the formation of mixtures capable of dissolving benzyl cellulose, which results in a loss of benzyl cellulose in the wash liquors during the purification.

It has been found that while aromatic hydrocarbons are generally swelling agents for benzyl cellulose, aliphatic hydrocarbons are generally coagulating agents, and we have found that suitable organic solvents for use according to our invention are mixtures of aliphatic and aromatic hydrocarbons, the proportions being chosen so as to avoid coagulation and minimize swelling action; e. g. a 50/50 mixture by weight is found generally suitable, but variations may be desirable according to the degree of benzylation and of degradation. The mixture should contain not less than 20% and not more than 80% by weight of aromatic hydrocarbons, the remainder being aliphatic. For the aromatic hydrocarbons we use benzene, toluene or xylene, or mixtures of these. For the aliphatic hydrocarbon we use mixtures of some of the lower boiling members of the paraffin series such as ligroin, petroleum ether, white spirits, light paraffin oil or petrol. Naturally occurring hydrocarbons which contain both aliphatic and aromatic fractions within the limits given come within the scope of this invention.

In order to facilitate recovery of the wash liquor by distillation and to ensure complete removal of the wash liquor from the benzyl cellulose during the drying process it is advantageous to choose a liquor with a boiling range between 60° C.–140° C. and preferably between 80° C.–120° C.

According to a further feature of the invention the process of purification of the mass of benzylated cellulose is effected by the use of the organic solvent as defined in the preceding paragraph, without any preliminary incorporation of wetting agent. A previous washing or washings with water may be given if desired. We find that the selected organic solvents above mentioned are so effective that they may be able to remove the impurities even from crude benzylated cellulose which has not been incorporated with wetting agents. It is desirable, however, in such a case to reduce the mass to lumps of reasonably small size; this can be done by known methods. The mineral impurities present in the reaction mass may be removed before or after treatment with the organic solvent: This is effected by washing with water, preferably acidulated.

Obviously our invention is applicable not only to the crude benzylated cellulose reaction mass, but also to partly purified benzyl cellulose, and these are to be understood as included in the term "benzylated cellulose mass" as used in this specification.

The following examples, in which the parts are by weight, illustrate without limiting our invention.

Example 1

100 parts of benzyl cellulose reaction mass containing 45–65% benzyl cellulose are incorporated in a Werner-Pfleiderer incorporator for any time up to two hours but preferably for ½ hour with 3–5 parts of Turkey red oil. The reaction mass breaks up into small lumps and is transferred to a mixer fitted with rapid and efficient stirring, and containing 800 parts of water. The washing in the mixer is continued for 1½–2½ hours after which the white aqueous liquid, containing an appreciable amount of impurities, partially in solution and partly in the form of an aqueous emulsion is run off and the product is washed again in the mixer with a further 800 parts of water for ½–1 hour.

The liquid is again run off and the benzyl cellulose is given two further washings of a ½ to 1 hour duration, first with 800 parts of water containing 1% of Turkey red oil and then with 800 parts of water. A final water wash may be necessary to free the product from traces of Turkey red oil. The crude benzyl cellulose is now in the form of fine granules and when dry contains less than 0.5% and generally less than 0.1% of benzyl chloride. For certain applications of benzyl cellulose it is suitable without any subsequent treatment.

Example 2

The product from Example 1 may be further purified, as desired, without any intermediate drying operation, by washing in a mixer with 200–300 parts of a mixture containing 60% of toluene and 40% of a paraffin fraction known as white spirits. It is centrifuged, given two further washes with 100 parts of solvent mixture of the same composition, centrifuged and dried when it is obtained in the form of white or whitish granules, substantially free from organic impurities and free from odour.

Example 3

500 parts of benzyl cellulose reaction mass are incorporated in a Werner Pfleiderer incorporator, or other suitable mixing machine, for one hour with 15 parts of Turkey red oil. The disintegrated mass is washed for ¾ hour with 500 parts of a mixture of 50% toluene and 50% petroleum ether, the wash liquor is separated by decantation, suction or centrifuging, and the mass given four further washes with mixtures of the same composition. Finally it is washed with water to remove salt and other water soluble impurities.

The product is obtained in the form of a white or whitish granules, which are substantially free from benzyl alcohol and benzyl ether, and free from residual odour.

Example 4

500 parts of benzyl cellulose reaction mass are ground in a mechanical mortar with 1000 parts of a mixture containing 60% of low boiling aliphatic paraffins and 40% of benzene. The wash liquor is filtered off and the mass given three further washings. Finally it is washed thoroughly with water and dried. The purified material is obtained in the form of a pure white or whitish powder which is substantially free from organic impurity and entirely free from residual odour.

We claim:

1. In the process of producing a relatively pure benzyl cellulose the step which comprises incorporating with the mass resulting from benzylation a water-soluble, high-molecular weight alkylated naphthalene sulfonic acid.

2. In the process of producing a relatively pure benzyl cellulose the step which comprises incorporating with the mass resulting from benzylation Turkey red oil.

3. A process for the purification of a benzylated cellulose mass, which includes the steps of incorporating with the same up to about 10 per cent. by weight of Turkey red oil, whereby the crude benzyl cellulose is obtained in a form suitable for the removal of impurities by washing, and washing the product with water.

4. A process for the purification of a benzylated cellulose mass, which includes the steps of incorporating Turkey red oil with the same, whereby the crude benzyl cellulose is obtained in a form suitable for the removal of impurities by washing, and thoroughly agitating and washing the product with excess of water in a plurality of stages.

5. A process for the purification of a benzylated cellulose mass, which includes the steps of comminuting the same, and washing the comminuted product with a mixture of 20–80 per cent. by weight of liquid aromatic hydrocarbons and 80–20 per cent. of liquid aliphatic hydrocarbons.

6. A process for the purification of a benzylated cellulose mass, which includes the steps of comminuting the same, and washing the comminuted product in a plurality of stages, first with water and then with a mixture of 20–80 per cent. by weight of liquid aromatic hydrocarbons and 80–20 per cent. of liquid aliphatic hydrocarbons.

7. A process for the purification of a benzylated cellulose mass, which includes the steps of comminuting the same, and washing the comminuted product in a plurality of stages, first with a mixture of 20–80 per cent. by weight of liquid aromatic hydrocarbons and 80–20 per cent. of liquid aliphatic hydrocarbons and then with water.

8. A process for the purification of a benzylated cellulose mass, which includes the steps of comminuting the same, in the presence of a mixture of 20–80 per cent. of liquid aromatic hydrocarbons and 80–20 per cent. of liquid aliphatic hydrocarbons, separating the comminuted benzyl cellulose from the liquid and subjecting it to further washing in a plurality of stages first with a mixture of 20–80 per cent. of liquid aromatic hydrocarbons and 80–20 per cent. of liquid aliphatic hydrocarbons and then with water.

9. In the process of producing a relatively pure benzyl cellulose the step which comprises incorporating with the mass resulting from benzylation a sulfonated wetting agent of the class consisting of a water-soluble, high-molecular-weight, alkylated naphthalene sulfonic acid and Turkey red oil.

10. A process for removing impurities from a benzylated cellulose mass which comprises incorporating into the mass a sulfonated wetting agent of the class consisting of a water-soluble high-molecular-weight alkylated naphthalene sulfonic acid and Turkey red oil, and removing said impurities and said wetting agent by washing with liquids in which said impurities are emulsifiable and which is incapable of coagulating benzyl chloride and of forming with the removed substances a solvent mixture for benzyl chloride, said liquids including a mixture containing 20% to 80% by weight liquid aromatic hydrocarbons and the remainder liquid aliphatic hydrocarbons, and water.

ALFRED STOYELL LEVESLEY.
FREDERICK CHARLES RANDALL.